(12) United States Patent
Olson et al.

(10) Patent No.: US 9,434,400 B2
(45) Date of Patent: Sep. 6, 2016

(54) MOBILE CLEANING SYSTEM

(75) Inventors: Eric B. Olson, Eagan, MN (US); Brian P. Carlson, Lakeville, MN (US); Troy A. Anderson, Eagan, MN (US); Jon D. Hansen, Apple Valley, MN (US); Ryan A. Chernik, St. Paul, MN (US); Adrian E. Hartz, Woodbury, MN (US); Seth Y. Raley, Minneapolis, MN (US)

(73) Assignee: Ecolab USA Inc., St. Paul, MN (US)

( * ) Notice: Subject to any disclaimer, the term of this patent is extended or adjusted under 35 U.S.C. 154(b) by 569 days.

(21) Appl. No.: 13/154,883

(22) Filed: Jun. 7, 2011

(65) Prior Publication Data
US 2012/0312390 A1 Dec. 13, 2012

(51) Int. Cl.
| | |
|---|---|
| A47L 7/00 | (2006.01) |
| A47L 5/00 | (2006.01) |
| A47L 9/00 | (2006.01) |
| B62B 3/02 | (2006.01) |
| B62B 3/00 | (2006.01) |
| A47L 11/40 | (2006.01) |
| A47L 13/51 | (2006.01) |
| A47L 13/512 | (2006.01) |
| B26B 3/02 | (2006.01) |

(52) U.S. Cl.
CPC .............. *B62B 3/02* (2013.01); *A47L 11/4075* (2013.01); *A47L 11/4083* (2013.01); *A47L 11/4091* (2013.01); *A47L 13/51* (2013.01); *A47L 13/512* (2013.01); *B62B 3/005* (2013.01); *B26B 3/02* (2013.01); *B62B 2202/50* (2013.01); *Y10T 137/3802* (2015.04)

(58) Field of Classification Search
CPC ..... B62B 2202/50; B62B 3/02; B62B 3/002; B62B 3/005; A47L 9/0063; A47L 9/009; A47L 13/51

See application file for complete search history.

(56) References Cited

U.S. PATENT DOCUMENTS

| | | | | |
|---|---|---|---|---|
| 3,573,897 | A | | 4/1971 | Wache |
| 4,986,555 | A | * | 1/1991 | Andreen .................... 280/47.35 |
| 5,089,037 | A | * | 2/1992 | Marsolais ................. A47L 5/36 15/323 |

(Continued)

FOREIGN PATENT DOCUMENTS

| | | | |
|---|---|---|---|
| DE | 2314497 A1 * | 4/2011 | .............. B62B 3/02 |
| EP | 2000069 A2 | 7/2010 | |

(Continued)

OTHER PUBLICATIONS

WO 2010/019808 A3, Rouillard et al., Feb. 18, 2010.*

(Continued)

*Primary Examiner* — Bryan R Muller
(74) *Attorney, Agent, or Firm* — Mckee, Voorhees & Sease, PLC (57) ABSTRACT

A mobile cleaning system (10) that enables touch-free, daily cleaning and disinfecting to areas or locations within an establishment is provided. The system includes generally a push cart (12) having front (18) and rear (20) sections spaced between vertically upstanding side sections (22A-B). One or more sections of the cart (12) include a modulated space configurable with one or more cleaning and/or disinfecting modules for performing and supporting a cleaning and/or disinfecting operation. A tool drip tray (30) extends outward from at least one of the sections beneath a tool storage location (32A-B) for preventing liquid or debris from dropping onto a surface beneath the cart (12) while stationary or in transit.

20 Claims, 9 Drawing Sheets

(56) References Cited

U.S. PATENT DOCUMENTS

| | | | |
|---|---|---|---|
| 5,263,223 A * | 11/1993 | Fiegel et al. | A47L 5/28 15/264 |
| 5,579,555 A | 12/1996 | Pearse | |
| 6,206,980 B1 | 3/2001 | Robinson | |
| 6,283,170 B1 | 9/2001 | Robinson | |
| 6,497,423 B1 * | 12/2002 | Perelli et al. | B62B 3/10 280/47.34 |
| 6,827,357 B2 * | 12/2004 | Calmeise et al. | A47L 13/51 280/47.34 |
| 7,028,925 B2 * | 4/2006 | Guest et al. | A47L 11/4044 134/100.1 |
| D533,705 S * | 12/2006 | Bertucci et al. | D34/14 |
| 7,272,869 B1 | 9/2007 | Robinson | |
| 7,455,246 B2 | 11/2008 | Roth et al. | |
| 7,472,456 B2 * | 1/2009 | Moore et al. | 15/323 |
| 7,717,354 B1 | 5/2010 | Robinson | |
| 2002/0148066 A1 | 10/2002 | Bullis | |
| 2005/0011037 A1 * | 1/2005 | Zhao et al. | A47L 9/009 15/323 |
| 2005/0013763 A1 | 1/2005 | Bober et al. | |
| 2005/0076467 A1 | 4/2005 | Stephens et al. | |
| 2006/0254020 A1 | 11/2006 | Robinson et al. | |
| 2007/0187528 A1 * | 8/2007 | Roth et al. | B08B 3/026 239/146 |

FOREIGN PATENT DOCUMENTS

| | | |
|---|---|---|
| WO | WO 00/54646 A2 | 9/2000 |
| WO | 2006053079 A1 | 5/2006 |
| WO | 2010019808 A2 | 2/2010 |
| WO | 2010019808 A3 | 2/2010 |
| WO | WO 2010/019808 A2 | 2/2010 |

OTHER PUBLICATIONS

EP 2000069 Vermop Salmon Gmbh—English Translation.
PCT/IB2012/052888—ECOLAB USA Inc. et al.—"Notification of Transmittal of The International Search Report and The Written Opinion of the International Searching Authority, or the Declaration" mailed Jan. 29, 2013.

* cited by examiner

MOBILE CLEANING SYSTEM

FIELD OF THE INVENTION

This invention relates generally to a mobile cleaning system, and more particularly to a mobile cleaning system that enables touch-free cleaning and disinfecting in full service and quick service applications using existing products. Portable cleaning and disinfecting units are often used to clean and disinfect various areas and locations within an establishment, such as restrooms, front of the house areas, entrance halls, wait stations, and bar areas in a restaurant. These systems lack the flexibility to accommodate, support and provide for the various types of cleaning and disinfecting operations performed in these areas. Moreover, existing units fail to store on-board all the necessary tools to facilitate the various cleaning and disinfecting operations thereby posing a high risk for unwanted contact and exposure to the cleaning and disinfecting products being used. In some situations, post cleanup may also be required in areas of use of the existing cleaning systems to prevent hazards from arising.

The present invention addresses these problems and provides for a mobile cleaning system that enables touch-free, daily cleaning and disinfecting to areas or locations within an establishment.

In addition, the present invention addresses the various types of cleaning and disinfecting operations that are used for various locations within an establishment by providing a modulated approach to a mobile cleaning unit.

The present invention also addresses the storage, handling and hazards associated with the on-board tools used in a cleaning and disinfecting operation.

SUMMARY OF THE INVENTION

In one embodiment, the invention is a mobile cleaning system. The system includes a push cart having a front and rear section spaced between vertically upstanding side sections. A space exists within one section having at least a first configuration for housing a first module and a second configuration for housing a second module. A tool drip tray extends generally horizontally outward from at least one of the sections beneath a tool storage location.

In another embodiment, the invention is a mobile cleaning system that includes a push cart having front and rear sections and at least one vertically upstanding side section. At least one section of the cart includes a modulated space configurable to at least a first and a second configuration for supporting one or more cleaning and/or disinfecting operations. The first configuration removably houses a wet-vacuum module. A tool trip tray extends generally horizontally outward from at least one of the sections beneath a tool storage location on the cart.

In another embodiment, the invention is a mobile cleaning system having a push cart with front and rear sections and at least one vertically upstanding side section. A modulated space is included within one section and is configurable to at least a first and a second configuration for supporting one or more cleaning and/or disinfecting operations. The first configuration removably houses a storage shelf module. A tool drip tray extends generally horizontally outward from at least one of the sections beneath a tool storage location on the cart.

BRIEF DESCRIPTION OF THE DRAWINGS

While the Specification concludes with claims particularly pointing out and distinctly claiming the invention, it is believed that the present invention will be better understood from the following description taken in conjunction with the accompanying drawings, in which:

DETAILED DESCRIPTION OF THE PREFERRED EMBODIMENTS

In the following detailed description, references are made to the accompanying drawings, wherein like numerals represent like parts throughout the several views that form a part hereof, and which is shown by way of illustration specific embodiments in which the invention may be practiced. These embodiments are described in sufficient detail to enable those skilled in the art to practice the invention, and it is to be understood that other embodiments may be utilized and that logical changes may be made without departing from the spirit and scope of the present invention. The following detailed description is, therefore, not to be taken in a limiting sense, and the scope of the present invention is defined only by the claims and equivalences thereof.

Embodiments of the present invention are directed to a mobile cleaning system 10 that enables touch-free cleaning and disinfecting of various areas within an establishment.

Figure 1A:
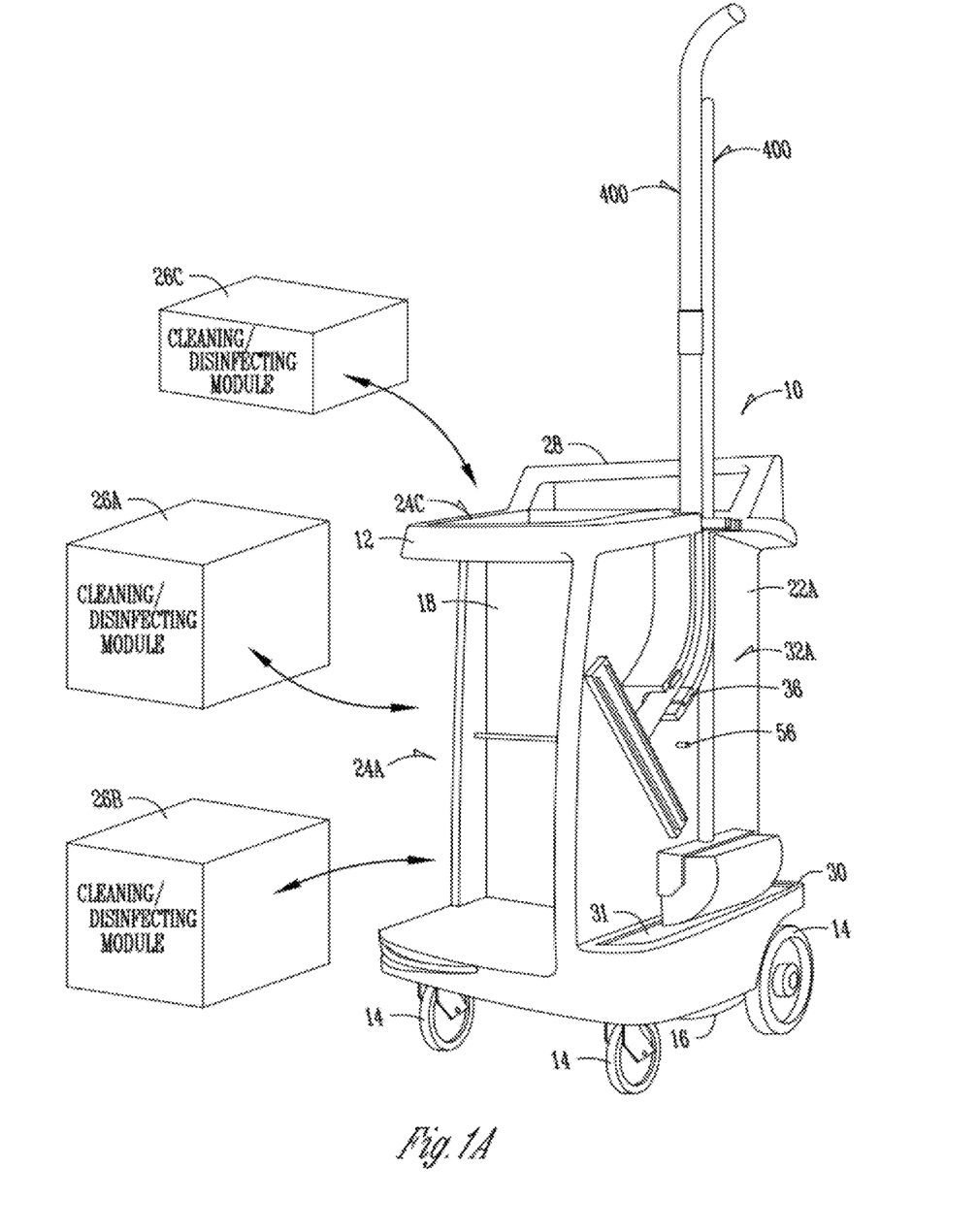
FIG. 1A is a front perspective view of the mobile cleaning system of the present invention.
Figure 1B:
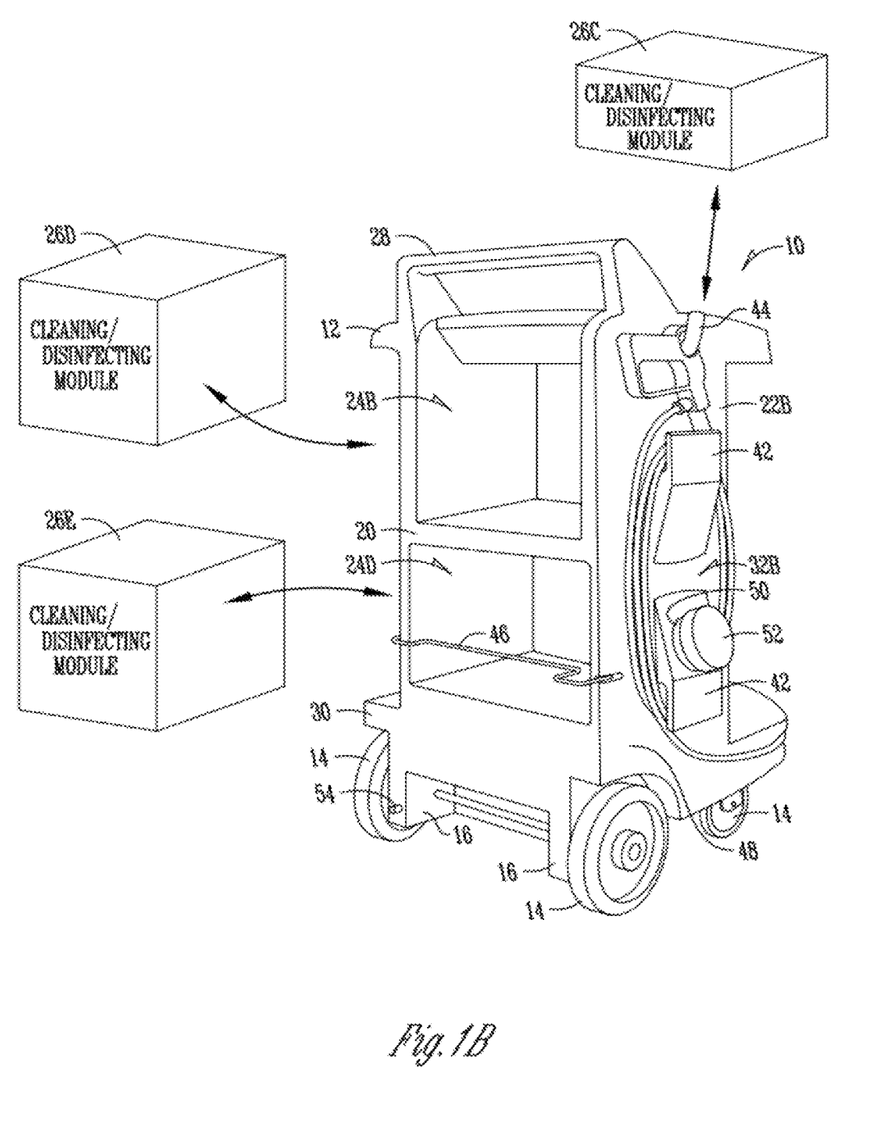
FIG. 1B is a rear perspective view of the mobile cleaning system shown in FIG. 1A.

Referring now to FIGS. 1A-B, there is generally disclosed at 10 a mobile cleaning system according to one embodiment of the present invention. The mobile cleaning system includes a cart 12 having a frame 16 that includes a front section 18 and rear section 20 spaced generally between vertically upstanding side sections 22A-B. Wheels 14 are provided at the bottom of the frame 16 for supporting rolled movement of the cart 12. The wheels 14 may include unidirectional wheels or swivel-type wheels with lever brakes for locking out the wheel from rotating to keep the cart 12 in a desired location. A handle 28 is configured generally at the top of the cart in the rear section 20 for gripping, pushing and pulling the cart 12. The present invention contemplates that the handle 28 may also be positioned on the front section 20 of the cart 12. The cart 12 is configured with one or more modulated spaces, such as at the front section 18, rear section 20 and/or side sections 22A-B. In one aspect of the present invention, the front section 18 includes a modulated space 24A adapted to removably receive one or more cleaning and/or disinfecting modules such as modules 26A and module 26B. Any number of cleaning and/or disinfecting modules can be configured for removable receipt within the modulated space 24A in the front section 18 of cart 12. Similarly, as best illustrated in FIG. 1B, the rear section 20 of cart 12 may be configured with one or more modulated spaces such as modulated space 24B and 24D. Each of these modulated spaces may be configured for removable receipt of one or more types of cleaning and/or disinfecting modules for performing one or more cleaning and/or disinfecting operations. For example, the modulated space 24B may be configured to removably house module 26D or one or more other modules. Likewise, the modulated space 24D may be configured to removably house one or more cleaning and/or disinfecting modules, such as module 26E, for performing a cleaning operation. In one or more instances, the cleaning and/or disinfecting modules may be configured as permanent fixtures and/or components in a modulated space on the cart 12.

As best illustrated in FIG. 1A, the top section of the cart 12 includes modulated space 24C configured for removably housing one or more cleaning and/or disinfecting modules, such as module 26C. According to the foregoing, one or more sections of the cart 12 are configured with a modulated space. Each modulated space may be configured for removably housing one or more module types, such as a cleaning and/or disinfecting module. The modules may be permanently affixed to the cart 12 in instances where the module is to be a permanent component of the mobile cleaning system 10. The type of module preferably corresponds to the type of cleaning operation. Furthermore, each module may include tools or accessories for performing a cleaning operation or cleaning products for use in the cleaning operation. In another aspect of the present invention, one or more sections of the cart 12 may include a space or section for removably housing one or more tools, accessories or products for performing a cleaning or disinfecting operation. One or more of the sections of the cart 12 may also include locations for collecting solid or liquid debris associated with a cleaning or disinfecting operation. Other features of the cart 12 may include using the frame 16 for housing a liquid tank 48. The liquid tank 48 within the cart 12 may include a fill opening 15 and a fill cap 52 for removably covering the opening 50, and a drain 54 for draining liquid from the tank 48. The present invention also contemplates that the liquid tank 48 may be configured as a modulated component and adapted for removably housing it within one or more of the modulated spaces on the cart 12.

Figure 6:
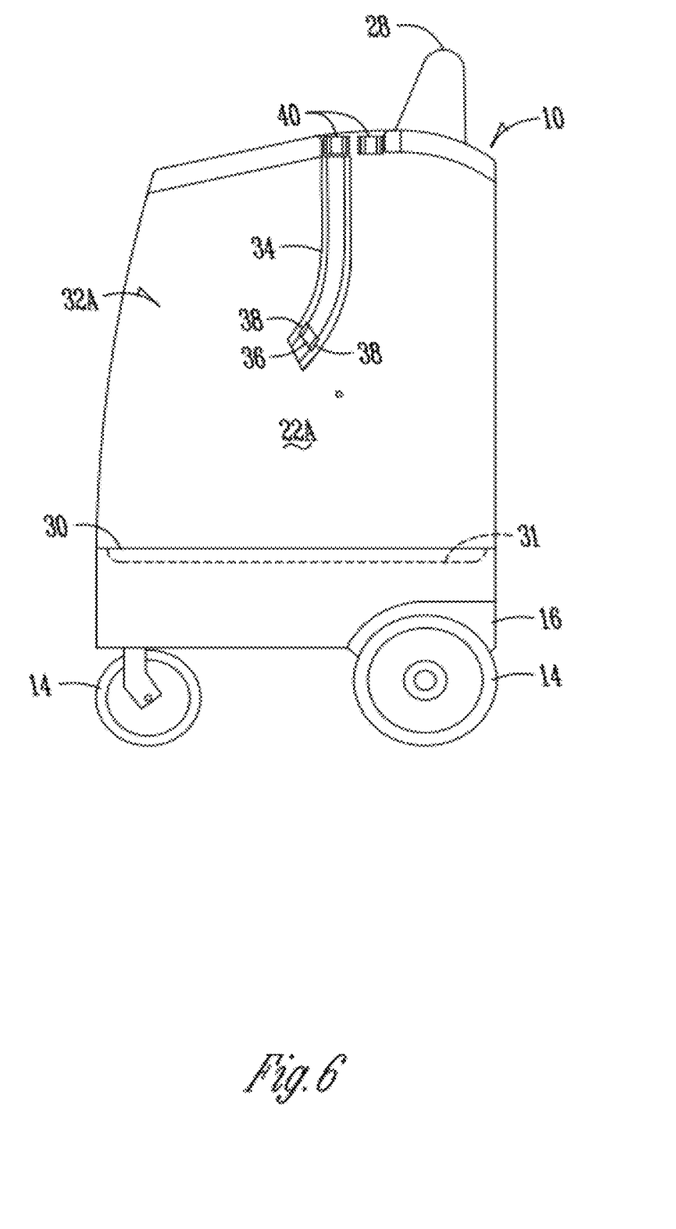
FIG. 6 is a side elevation view illustrating a tool storage location on the cart.

FIG. 1A illustrates at least one section of the cart 12, including side section 22A. Side section 22A or another section of the cart 12 may be configured with a tool storage location 32A. The tool storage location 32A includes one or more features for removably securing an accessory or cleaning tool to the cart 12. In one aspect of the present invention, the features for removably securing cleaning tools and accessories at the cart 12 include a tool guide 34 as shown in FIGS. 1A, 2B, 3B, and 6. The tool guide 34 includes a generally arcuate-shaped guide with generally outwardly extending edges spaced apart by an opening. The arcuate-shape of the guide is configured to correspond with the arcuate shape of a tool handle 402. The tool guide 34 may include one or more snap clips 36 having opposing fingers 38 spaced apart by an opening and configured to removably secure the handle 402 of a tool 400 (as best illustrated in FIGS. 3B and 6. The arcuate-shaped nature of the tool guide 34 secures the handle 402 of tool 400 at the tool storage location 32A so that the tool head 404 is positioned directly above the basin 31 in the tool drip tray 30. The tool storage location 32A may include one or more additional features for removably securing a tool or accessory on the cart 12.

For example, the tool storage location 32A may include one or more retention clips 40 as shown in FIG. 6 for removably securing the handle 402 of a tool 400 adjacent a section of the cart 12. The retention clip 40 may include one or more alignment features for removably securing the handles of one or more tools 400.

Figure 2A:
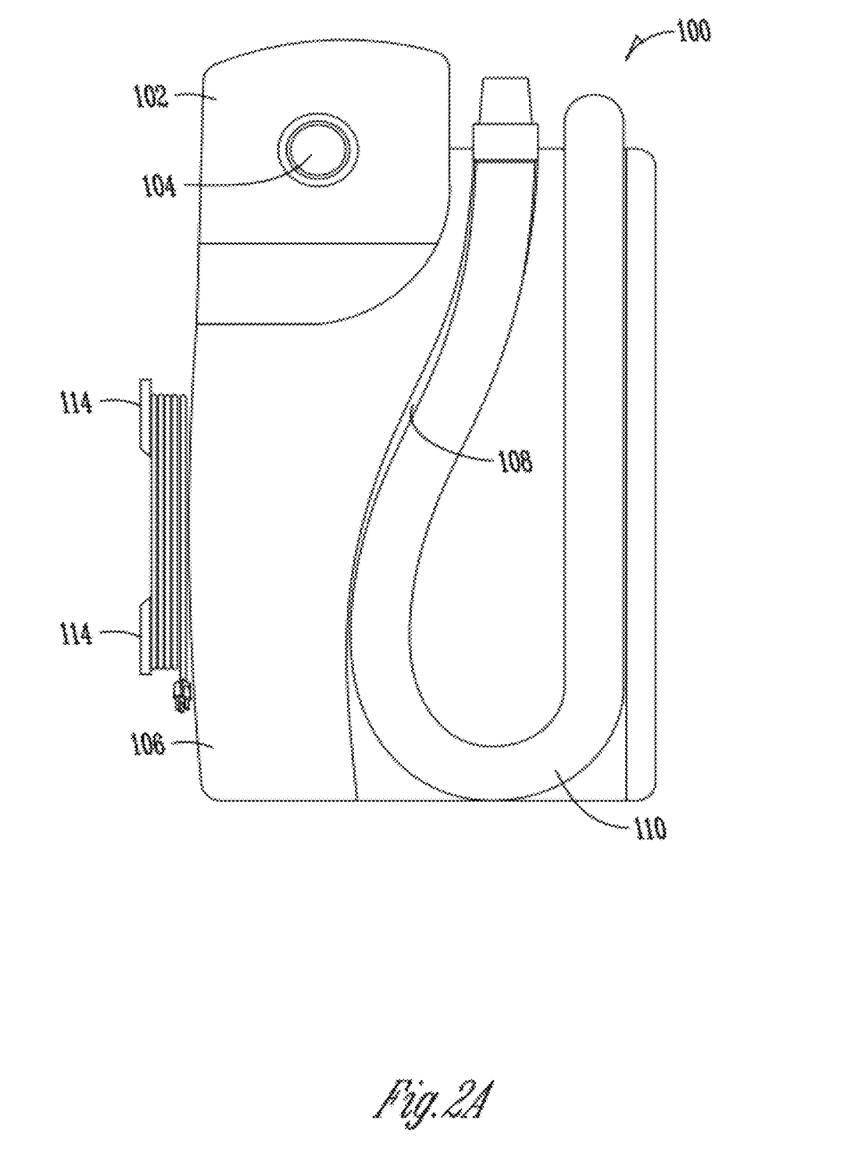
FIG. 2A is a front elevation view of a wet-vacuum module according to one embodiment of the present invention.
Figure 2B:
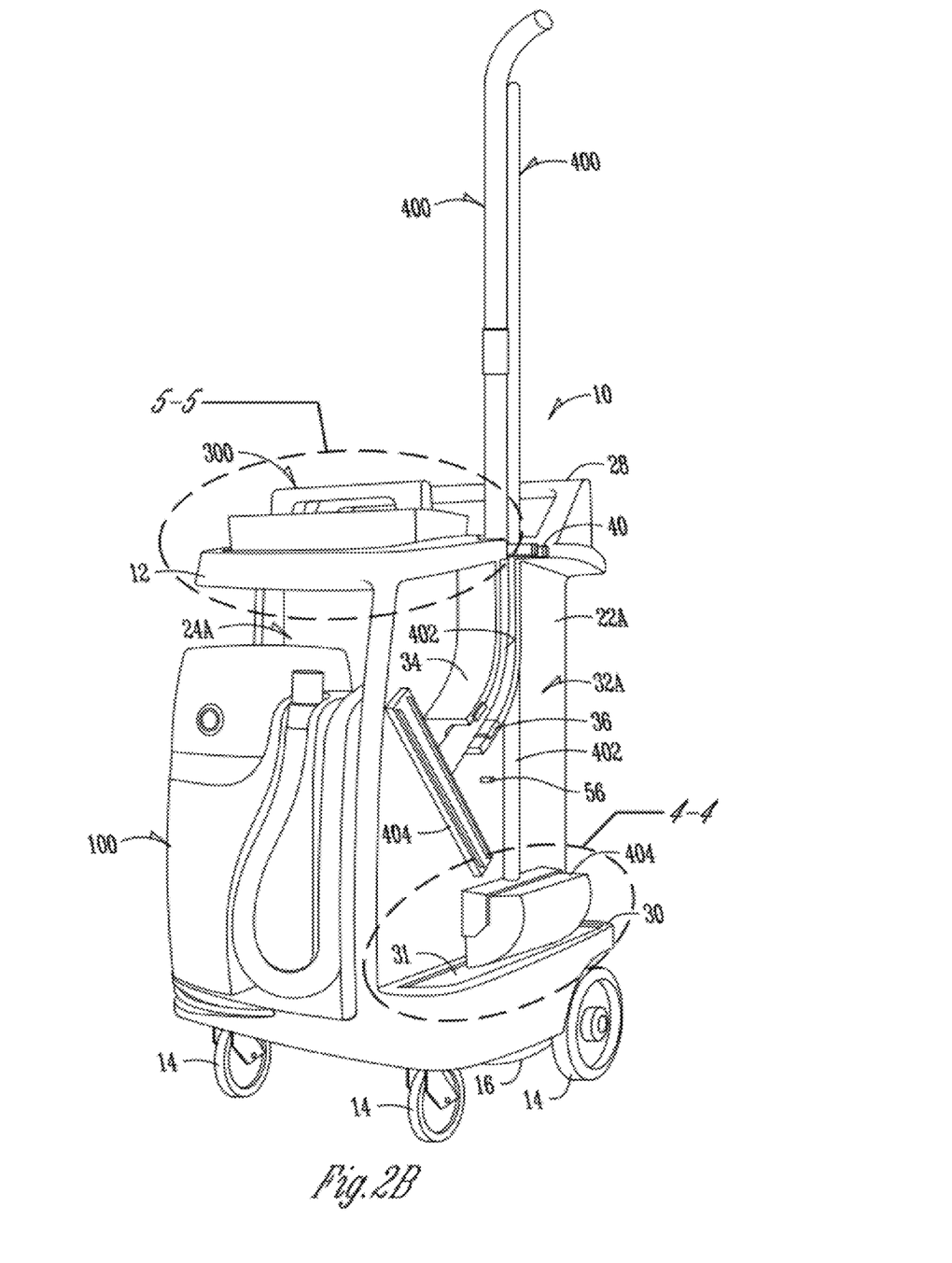
FIG. 2B is a front perspective view of the wet-vacuum module removable installed in a modulated space on the cart.

As best illustrated in FIG. 2B, the handle 402 of the tool 400 is removably secured to the cart with the tool head 404 resting within the basin 31 of the tool drip tray 30. The tool storage location 32A may also be configured to position the tool head 404 of each tool 400 spaced directly above the basin portion 31 of the tool drip tray 30. In this manner, both liquid and solid debris from the tool head 404 and/or tool 400 is collected in the tool drip tray 30 and prevented from dripping onto the surface beneath the cart 12. Other sections of the cart 12 may also include features for removably securing tools or accessories associated with a cleaning and/or disinfecting operation.

As illustrated in FIG. 1B, side section 22B includes a pair of spaced apart, opposing hose wraps 42. The hose wraps 42 may be integral to the frame 16 of the cart 12 or attached directly to a section of the cart. Side section 22B also includes a tool hanger 44 comprising a generally outwardly extending post for removably securing one or more tools or accessories used in conjunction with a cleaning and/or disinfecting operation.

FIGS. 2A-7 illustrate specific modulated components, tools and accessories of the mobile cleaning system 10 of the present invention. Specifically, FIGS. 2A-B illustrate a wet-vacuum module 100 of the present invention. The wet-vacuum module 100 is configured for removably securing within the modulated space 24A. A retention bar 56 shown in FIG. 1A extends between the two side sections 22A and 22B of the cart 12 within the modulated space 24A. The wet-vacuum module 100 includes a retention clip (not shown) that removably affixes to the retention bar 56 for securing the wet-vacuum module 100 within the modulated space 24A. The module 100 is removed by separating the retention clip 112 from the retention bar 56, such as by lifting the module 100 out of the modulated space 24A. The wet-vacuum module 100 includes a vacuum source 102 having an inlet 104 in fluid communication with a recovery tank 106. The vacuum source 102 is separably connected to the recovery tank 106. The recovery tank 106 includes a hose-shaped concavity for removably securing the vacuum hose 110 to the recovery tank 106. The hose-shaped concavity 108 allows the vacuum hose 110 to be stored on the wet-vacuum module 100. The present invention also contemplates that other parts of the wet-vacuum module 100 may include a similar hose-shaped concavity for removably securing the vacuum hose 110 or additional lengths of vacuum hose. The recovery tank 106 also includes a pair of extension cord wraps 114 integral to the material forming the recovery tank 106. The extension cord wraps 114 are formed by equal and oppositely spaced arms extending outwardly from and then generally parallel to the recovery tank 106. The extension cord wraps 114 allow the electrical cord to be stored on the wet-vacuum module 100. Thus, when the wet-vacuum module 100 is removed from the cart 12, the vacuum hose 110 and electrical cord are removed with the module. The hose-shaped concavity 108 and extension cord wraps 114 are preferably integral to the recovery tank 106, however the present invention contemplates that the hose-shaped concavity 108 and extension cord wraps 114 may be configured into other components of the wet-vacuum module 100. In use, the vacuum hose 110 is removed from the hose-shaped concavity 108 and connected to the inlet 104 of the vacuum source 102. The opposite end of the vacuum hose is connected to a wet-vacuum tool such as the tool 400 having a squeegee vacuum head 404 illustrated in FIG. 2B. When not in use, the vacuum hose 110 is docked within the hose-shaped concavity 108 in the recovery tank 106, the vacuum hose 110 may also remain connected to the inlet 104 of the vacuum source 102, and the electrical cord is wrapped around and stored on the extension cord wraps 114.

Figure 3A:
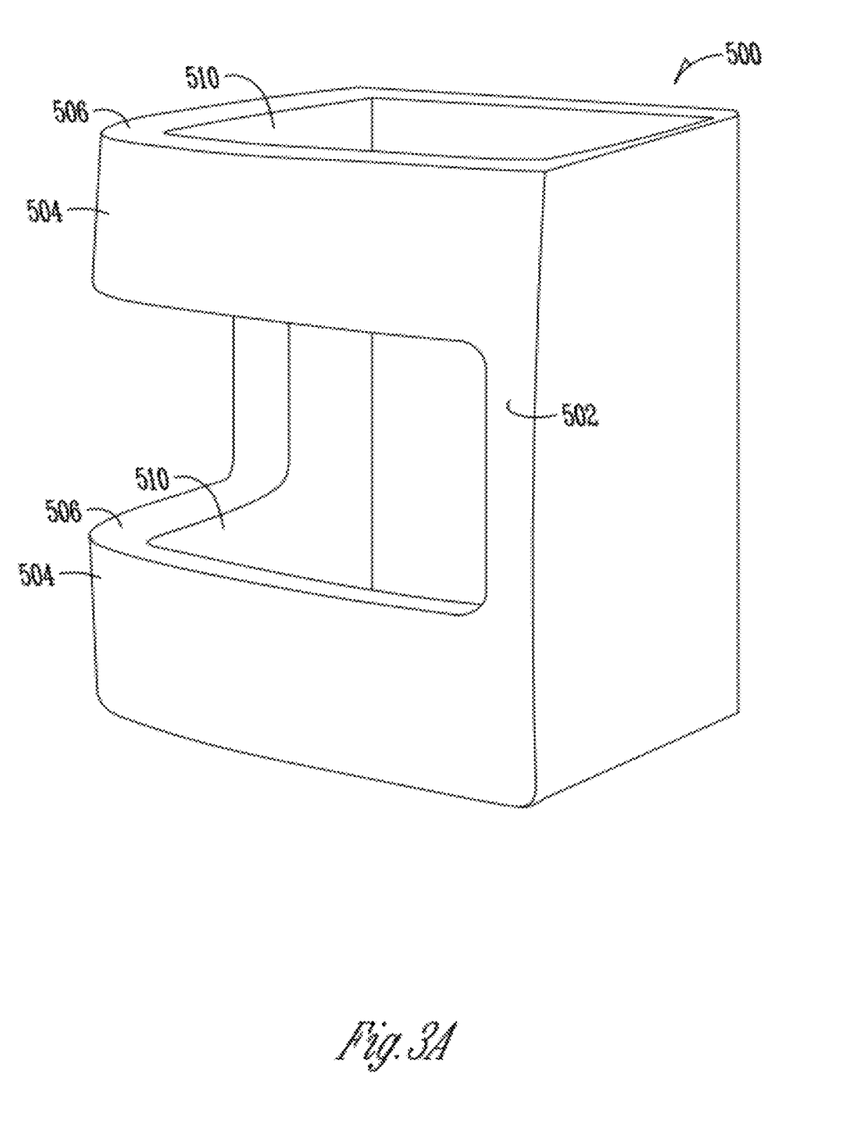
FIG. 3A is a front perspective view of the shelf module according to one embodiment of the present invention.
Figure 3B:
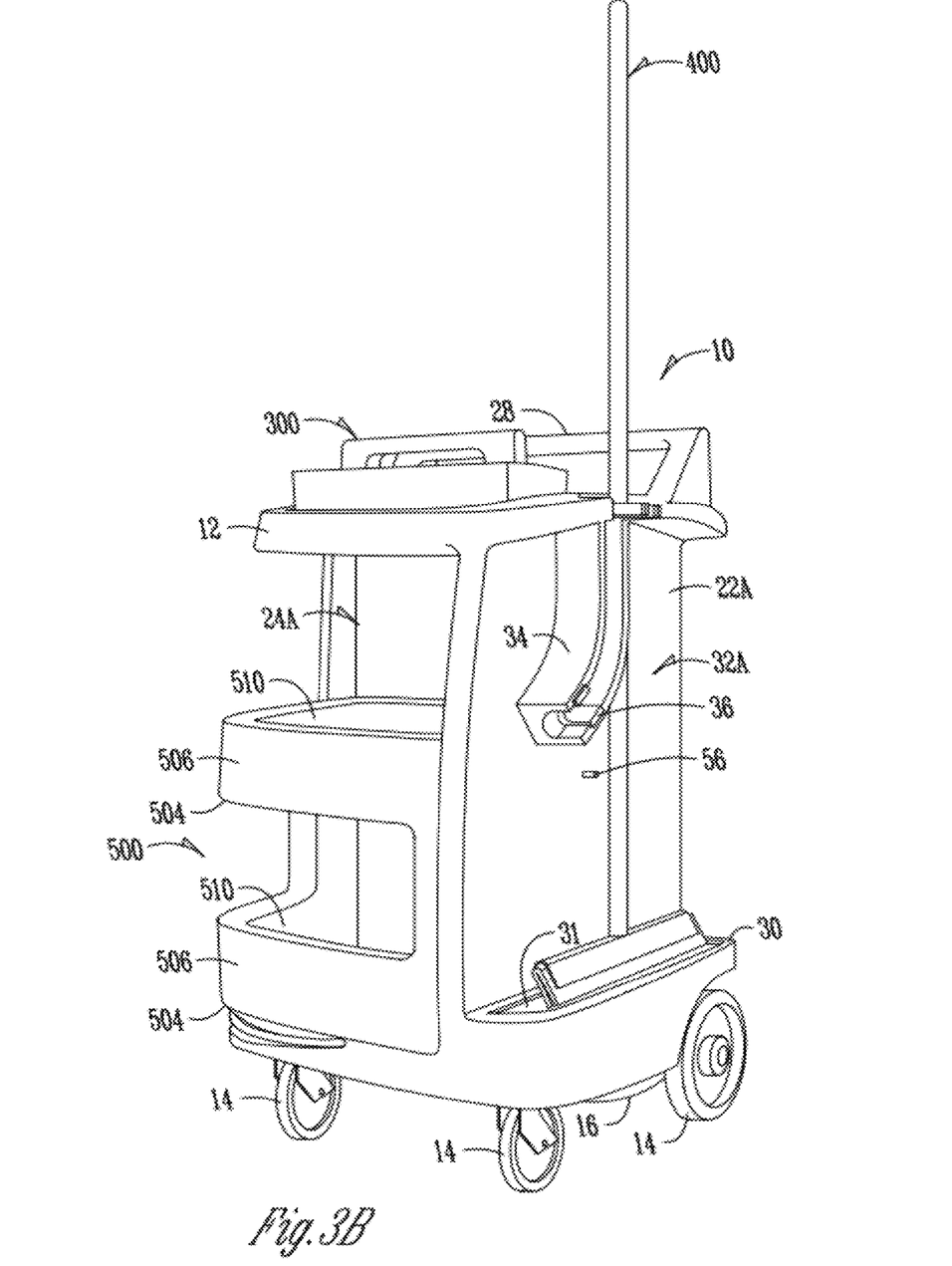
FIG. 3B is a front perspective view of the shelf module removably housed within a modulated space on the cart.

FIGS. 3A-B illustrate another module of the present invention configured for removably securing within the modulated space 24A on cart 12. The shelf module 500 illustrated in FIGS. 3A-B includes a frame 502 supporting one or more shelves 504. Each shelf 504 includes a retaining wall 506 for keeping items or other accessories from falling off the shelf. The shelf 504 and retaining wall 506 forms a compartment 510 for storing one or more items, such as additional product bags, paper towels, spray bottles, clean rags, or additional accessories required in certain cleaning and/or disinfecting operations. The frame 502, shelves 504 and retaining wall 506 are generally integral portions of the shelf module 500. The shelf module includes openings between the one or more shelves 504 for allowing removable storage and retrieval of cleaning products, accessories, tools or other items associated with a cleaning and/or disinfecting operation. The shelf module 500 also includes a retention clip (not shown) for removably securing to the retention bar 56 (shown in FIG. 1A) in the modulated space 24A when the shelf module 500 is inserted into the space. The retention clip 508 separates from the retention bar 56 in the modulated space 24A when the shelf module 500 is lifted and separated from the cart 12. Thus, depending upon the cleaning operation, the user may swap out one module for another, such as the shelf module 500 for the wet-vacuum module 100 or vice-versa.

Figure 7:
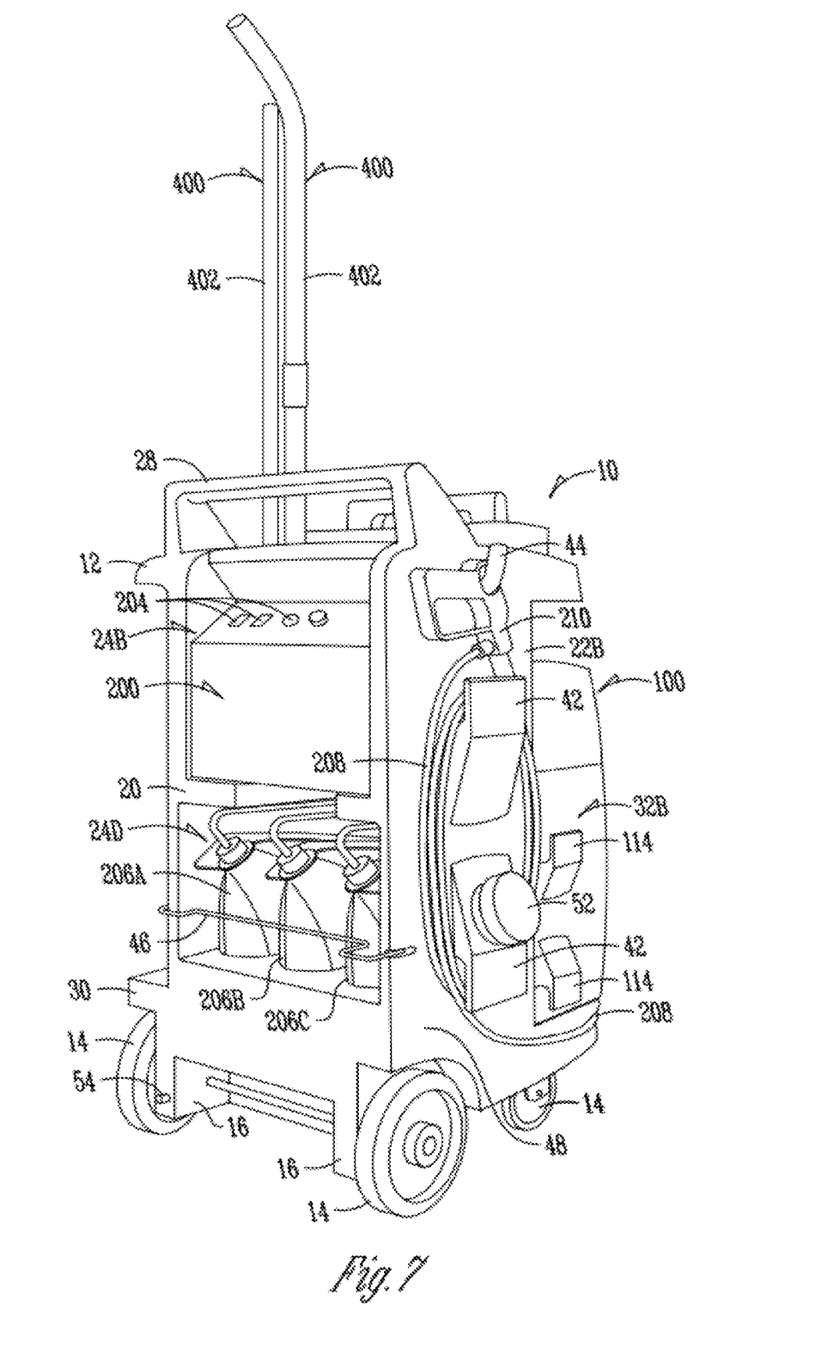
FIG. 7 is a rear perspective view illustrating a product dispensing system of the present invention.

FIG. 7 illustrates other components or modules of the present invention. The components illustrated in FIG. 7 may be modulated or fixed to the cart 12. The liquid dispensing system 200 illustrated in FIG. 7 includes a pump, such as a battery operated pumping system (not shown) in communication with product containers 206A-C. The battery operated pumping system may be connected to an external battery charger for charging the battery aboard the cart 12. The liquid dispensing system 200 includes one or more controls 204 for controlling the product container 206A-C that is dispensed. The liquid dispensing system 200 also includes a spray hose 208 connected to the pump (not shown). The spray hose 208 includes a spray wand 210 for applying product to one or more surfaces for performing a cleaning and/or disinfecting operation. The spray hose 208 when not in use is wrapped around hose wraps 42 on the side section of cart 12. The pump (not shown) of the liquid dispensing system 200 is connected in fluid communication with the liquid tank 48 for mixing with product from product containers 206A-C and applying the solution to a surface for performing a cleaning and/or disinfecting operation. Controls 204 allow for adjustment of the type and concentration of the product being dispensed. The cart 12 may also include one or more surfaces having a spray hose-shaped concavity for housing and/or concealing the spray hose, or portions of the spray hose, routed around and/or through sections of the cart 12. Similarly, the cart 12 may be configured with a crossbar 46 for securing product containers 206A-C within the modulated space 24D.

Figure 5:
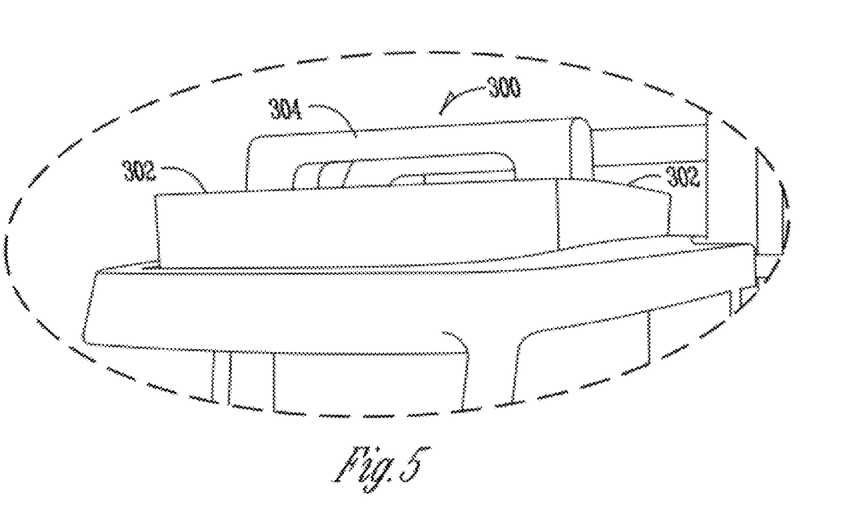
FIG. 5 is an enlarged view of a hand caddy taken along line 5-5 in FIG. 2B.

FIG. 5 illustrates a hand caddy module 300 of the present invention. The hand caddy module 300 is removably secured within modulated space 24C on cart 12. The hand caddy module includes a handle 304 and compartments 302 for holding cleaning products, accessories, tools or other supplies associated with a cleaning operation. The hand caddy module 300 may be removed from the cart 12, for example, for use in a cleaning and/or disinfecting operation or for restocking it with supplies and/or other items.

Figure 4:
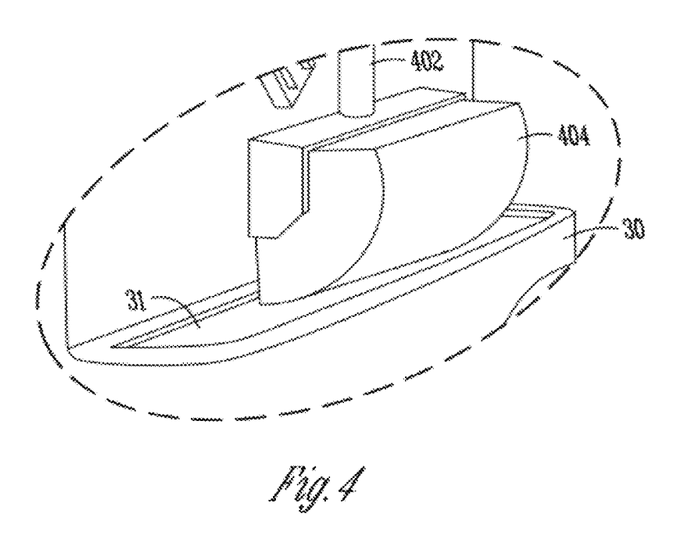
FIG. 4 is an enlarged view of the tool drip tray taken along line 4-4 in FIG. 2B.

One or more sections of the cart 12 may be configured for removably securing tools associated with one or more types of cleaning and/or disinfecting operations. For example, as illustrated in FIG. 2B, a tool 400 having a handle 402 or wand attached to a vacuum tool head 404 for use in connection with the wet-vacuum module 100 may be secured at the tool storage location 32A. Similarly, a tool 400 having a deck brush tool head 404 connected to handle 402 may be removably secured at the tool storage location 32A. A tool 400 having a floor squeegee tool head 404 may also be removably secured at the tool storage location 32A as illustrated in FIG. 3B. As best illustrated in FIG. 6, the tool guide 34, snap clip 36 and retention clip 40 at the tool storage location 32A allow the dirty end of each tool 400, such as the tool head 404, to be oriented directly above the basin 31 of the tool drip tray 30 to prevent liquid or other debris from dripping onto the surface beneath the cart 12, whether the cart 12 is stationary or in transit. The retention clip 40 is also configured to removably secure multiple handles for multiple tools to keep the tool head directly above the tool drip tray 30 to prevent liquid and other debris from falling on to the surface beneath or around the cart 12. For example, the tool head 404 connected to the handle 402 of the tool 400 may rest within the basin portion 31 of the tool drip tray 30 as illustrated in FIG. 4 to prevent liquid or other debris from falling onto the surface directly beneath and around the cart 12, whether in transit or stationary. The tool drip tray 30 prevents hazardous situations from arising as a result of liquid or debris that might otherwise collect on the floor beneath or around the cart 12, whether in transit or stationary. With the tool head 404 situated in the tool drip tray 30, the handle 402 is secured adjacent the cart using a retention feature such as retention clip 40 or snap clips 36. The tool guide 34 is configured in an arcuate shape as previously described, to house the arcuate-shaped handle 402 of a tool 400 used in a cleaning operation. For example, the curved or generally arcuate-shaped handle of the wet-vacuum tool 400 may be inserted within the tool guide 34 for removably securing the tool at the tool storage location 32A. One or more snap clips 36 may be included in the tool guide 34 for aiding in securing a tool 400 in the guide 34.

Although the specific embodiments have been illustrated and described herein, it will be appreciated by those of ordinary skill the art any arrangement, which is calculated to achieve the same purpose, may be substituted for the specific embodiment shown. This application is intended to cover any adaptations or variations of the present invention. Therefore, it is manifestly intended that this invention be limited only be the claims and the equivalences thereof.

What is claimed is:
1. A mobile cleaning system comprising:
a push cart comprising opposing front and rear sections separated by a vertical wall and spaced between vertically upstanding side sections, wherein the front and rear sections each include at least one modulated space for removably receiving one of a plurality of modules, wherein one of the vertically upstanding side sections is associated with a vertical sidewall extending substantially from the front of the push cart to the rear of the push cart, substantially perpendicular to the vertical wall separating the front and rear sections and having a height substantially equal to the height of the front and rear sections a tool storage location associated with the one of the vertically upstanding side sections and comprising one or more features for removably securing an accessory or cleaning tool to the cart and positioned above a basin of a tool drip tray extending generally horizontally outward from the vertical sidewall;

wherein the mobile cleaning system has:
(a) a first configuration wherein one of the at least one modulated space of the front section removably houses a self-contained wet-vacuum module including a vacuum source fluidly connectable to a recovery tank, and a second module removably secured within one of the at least one modulated space of the rear section, and
(b) a second configuration wherein the at least one modulated space of the front section houses a different module than the wet-vacuum module or the second module; and a horizontal retention bar within the at least one modulated space of the front, wherein the wet-vacuum module, the second module, or the different module is secured to the retention bar.

2. The system of claim 1 wherein the cart includes an external surface having one or more wet-vacuum accessory attachment points for removably securing accessories to the wet-vacuum.

3. The system of claim 1 wherein the one of the vertically upstanding side sections is separated from both the front section and the rear section by the vertical sidewall.

4. The system of claim 1 wherein the second module comprises a storage shelf.

5. The system of claim 1 wherein the tool storage location includes at least one tool guide and one tool clip.

6. The system of claim 5 wherein the vertical sidewall is adjacent to each of the front section, the rear section, and the one of the vertically upstanding side sections.

7. The system of claim 5 wherein a portion of the one of the vertically upstanding side sections is opposite the vertical sidewall from the front section, and further wherein another portion of the one of the vertically upstanding side sections is opposite the vertical sidewall from the rear section.

8. They system of claim 1 further comprising a top section connected between the vertically upstanding side sections.

9. The system of claim 6 wherein the top section includes a walled shelf adapted for removable storage of a hand caddy for storing cleaning tools and supplies.

10. A mobile cleaning system comprising:
a push cart comprising a front section, a rear section, and a top section, and a vertically upstanding side section, each of the front section, the rear section, and the top section including at least one modulated space for removably receiving one of a plurality of modules;
wherein the front section and the rear section are separated by a vertical wall and the modulated spaces of the front section and rear section open towards opposite directions;
wherein the vertically upstanding side section is separated from both the front section and the rear section by a vertical sidewall extending up to the top section substantially from the front of the push cart to the rear of the push cart and substantially perpendicular to the vertical wall separating the front and rear sections;

a generally horizontal retention bar in one of the modulated spaces wherein a first module or a second module are secured to the retention bar; and a tool drip tray extending generally horizontally outward from the vertical sidewall and positioned below a tool storage location of the vertically upstanding side section.

11. The system of claim 10 wherein the vertical sidewall is adjacent to each of the front section, the rear section, and the vertically upstanding side section.

12. The system of claim 10 further comprising a wet-vacuum module removable installable within the modulated space of the front section.

13. The system of claim 11 wherein a portion of the vertically upstanding side section is opposite the vertical sidewall from the front section, and further wherein another portion of the vertically upstanding side section is opposite the vertical sidewall from the rear section.

14. The system of claim 10 wherein each of the front section, the rear section, the vertically upstanding side section, and the top section are positioned above a frame of the push cart.

15. The system of claim 10 further comprising a storage shelf module positioned within the at least one modulated space of the front section.

16. A mobile cleaning system comprising:
a push cart comprising opposing front section, a rear section, and a vertically upstanding side section completely separated from both the front section and the rear section by a vertical sidewall extending substantially from the front of the push cart to the rear of the push cart and substantially perpendicular to a vertical wall separating the front section and rear section, wherein each of the front section and the rear section includes at least one modulated space for removably receiving one of a plurality of modules;
a storage shelf module removably positioned within one of the modulated spaces;
a wet-vacuum module removably positioned within a different one of the modulated spaces;
a horizontal retention bar within one of the front section and the rear section to secure either the storage shelf module or the wet-vacuum module;
a liquid dispensing system operatively connected to the push cart; and
a tool drip tray extending generally horizontally outward from the vertical sidewall and positioned below a tool storage location of the vertically upstanding side section.

17. The system of claim 16 wherein the storage shelf module includes securing means for removably securing the storage module within the at least one modulated space of the front section.

18. The system of claim 16 wherein the tool storage location includes at least one tool guide and one tool clip.

19. The system of claim 18 wherein the tool guide comprises an arcuate shaped guide having a tool clip with opposing fingers spaced on opposite sides of the guide to removably secure an arcuate shaped handle and tool head directly above the tool drip tray.

20. The system of claim 16 wherein a portion of the vertically upstanding side section is opposite the vertical sidewall from the front section, and further wherein another portion of the vertically upstanding side section is opposite the vertical sidewall from the rear section.

* * * * *